No. 881,933. PATENTED MAR. 17, 1908.
C. H. KRAMER.
VEHICLE.
APPLICATION FILED DEC. 3, 1906.
2 SHEETS—SHEET 2.
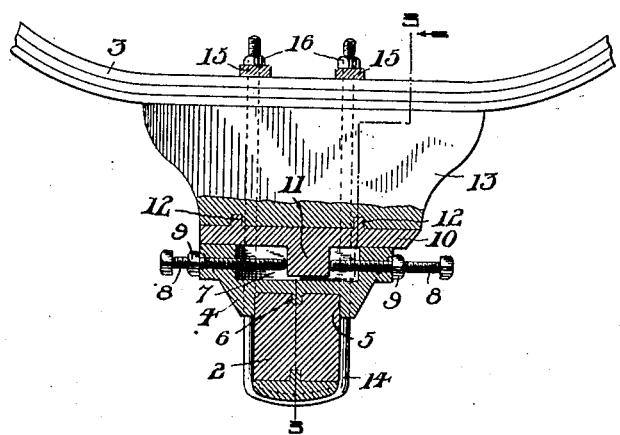
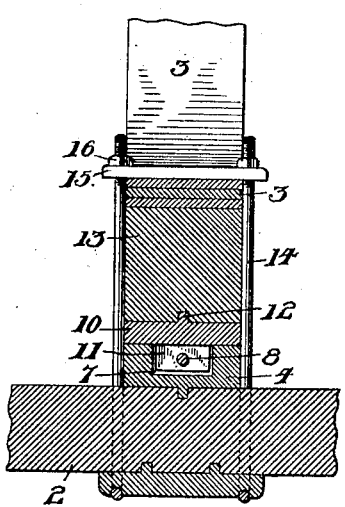
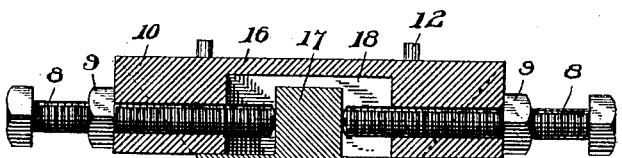
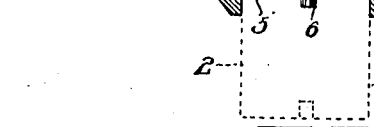
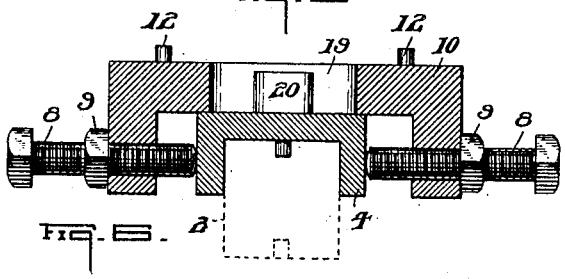
WITNESSES:
INVENTOR
Charles H. Kramer,
By H. W. Stevenson
ATTORNEY

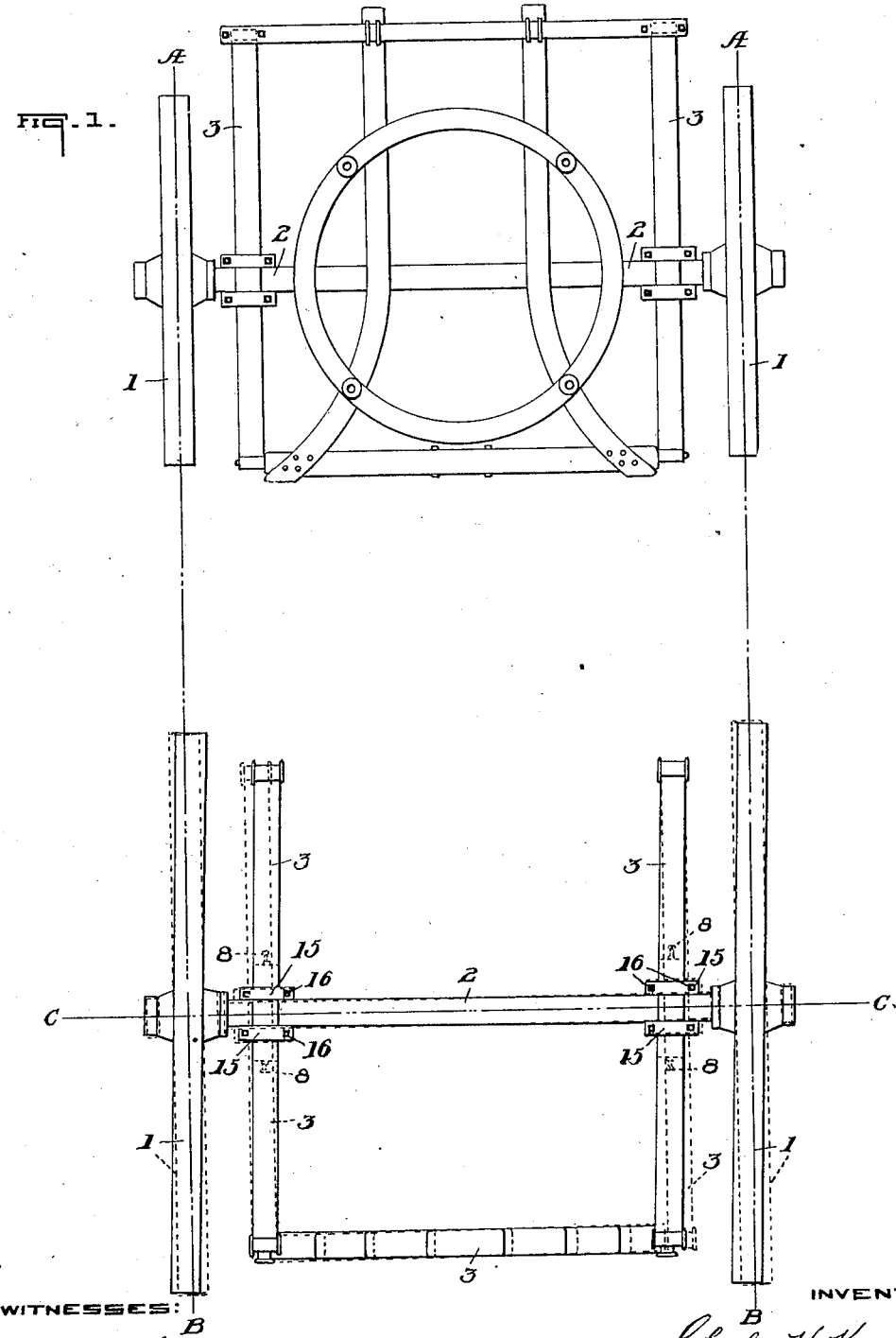

UNITED STATES PATENT OFFICE.

CHARLES H. KRAMER, OF PITTSBURG, PENNSYLVANIA.

VEHICLE.

No. 881,933.  Specification of Letters Patent.  Patented March 17, 1908.

Application filed December 3, 1906. Serial No. 345,987.

*To all whom it may concern:*

Be it known that I, CHARLES H. KRAMER, a citizen of the United States, residing at Pittsburg, in the county of Allegheny and State of Pennsylvania, have invented certain new and useful Improvements in Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a new and practical improvement in spring and platform vehicles, the primary object being to provide a simple and useful means for adjusting the axles of the vehicle in order that the wheels may run true and in alinement with each other.

In the accompanying drawings I have shown several detail views of my invention, in which:—

Figure 1, Sheet 1, is a plan view of the running gears of a platform wagon, the rear wheels being shown out of alinement, and also, in dotted lines, adjusted in their proper relationship with the front wheels. Fig. 2, Sheet 2, is a cross sectional view of my device as affixed to the axle and springs. Fig. 3 is a vertical section taken on line 3—3 of Fig. 2. Fig. 4 shows a modified form of my device. Fig. 5 is a second modification, and Fig. 6 a top view of the latter.

Throughout the drawings the numeral 1 designates the wheels of the vehicle, 2 the axles, and 3 the ordinary springs commonly used in vehicles of this character.

In the present method of constructing vehicles of the types before mentioned, the block, upon which rests the springs, is seated directly on a chain or block that fits over the axle, and all the parts secured together by suitable straps and tie means. Under the present method of adjusting the axles it necessitates considerable laborious and difficult work, and it is with the intention of overcoming and simplifying this adjusting process that I have invented the following described device. Seated on top of the axle 2 is a block 4 provided in its under side with a transverse slotted portion 5 for receiving said axle 2, and likewise one or more lugs 6 adapted to enter said axle and retain the block in position thereon. In my preferred form this block is shown provided with a longitudinal slotted portion 7 formed in its upper face, and entering this slot through the walls of the block, from both ends, are the set screw members 8—8, each having mounted thereon a jam nut 9. Seated on top of the block 4 is a bearing member 10 having a projecting lug 11 formed on the under side thereof and adapted to operate in the slot 7 formed in the block 4. The inner end of the set screws 8 engage against this lug 11 and when in locked contact therewith serve to prevent any movement of the block 4 with respect to the member 10. In the upper face of the member 10 there is provided a plurality of securing lugs 12, adapted to enter the spring bearing block 13 upon which is seated the spring 3. Suitable securing straps 14—14 of ordinary construction and usage engage around the axle and serve to keep all the contacting parts in position, being held thus by means of tie plates 15 and nuts 16.

When my device is in position on a vehicle, it being understood that there will be one of my devices attached to the axle at each side thereof, all the respective contacting members being arranged as shown in Fig. 2, in the event of the axle getting out of alinement, with the consequent result of the wheels not running true, and failing to track properly, it is simply necessary, first, to jack up the vehicle, then loosen the securing nuts 16, which will permit the straps 14 to yield. The jam nuts 9—9 are next turned from their engagement against the block 4 and in this position the adjustment process may be carried out.

By turning either one of the set screws 8 outwardly away from engagement with the lug 11, the screw 8 on the opposite side is free to be turned inwardly thus exerting a pushing movement against said lug 11 and in so doing the shoe 4 is made to slide against the member 10, which movement will carry with it the axle 3 and by so doing the wheels will be drawn to their proper alinement, as shown by the diagrammatical plan view, Fig. 1. Both set screws 8 are then turned in against the lug 11, thus locking the axle and wheels in position after which the securing straps 14 are inserted in their respective grooved seats and the nuts 16 tightened. In the modified form shown in Fig. 4, the same general construction of the two contacting members 4 and 10 is carried out with the exception that the limiting lug, here designated as 17, is formed on the adjustable member 4 and adapted to seat and operate in a slot 18 formed in the upper or fixed member 10.

The second modified form of my adjusting device shown in Figs. 5 and 6, consists of the bifurcated upper or fixed member 10 having a longitudinal slotted portion 19 formed therein. The adjusting block 4, which is also bifurcated to receive the axle 2, seats in the aforesaid member 10 being movable longitudinally therein, and is provided in its upper portion with a lug 20, which seats in the slot 19 formed in said member 10. The set screws 8—8 enter through the ends of the member 10 and engage against the ends of the adjusting block 4.

Having thus fully shown and described my invention what I claim as new, and desire to secure by Letters Patent is:

1. In a device of the character described; an adjustable shoe member secured to the axle; a slot formed in said shoe member; a fixed contacting member secured to the under side of the spring bearing block; limiting means, formed on said fixed member, adapted to enter and operate in the slot formed in said shoe member; and locking means, passing through the shoe and engaging the limiting means.

2. In a device of the character described; an adjustable shoe member secured to the axle; a slot formed in said shoe member; a fixed member secured to the under side of the spring bearing block; a lug formed on said fixed member adapted to enter and operate in the slot formed in said shoe member; and locking means, passing through the shoe member, adapted to engage the lug portion formed on said fixed member.

3. In a device of the character described; an adjustable shoe member seated over and secured to the axle; a slot formed in said shoe member; a fixed member secured to the under side of the spring bearing block adapted to engage the adjustable shoe member; a lug formed on said fixed member adapted to enter and operate in the slot formed in said shoe member; set screws entering said slot, their inner ends adapted to engage the lug formed on the fixed member; as, and for, the purpose set forth.

4. In a device of the character described the combination with the springs and axles of a vehicle, of a fixed member secured to the under side of the spring bearing block; a lug portion on said fixed member; an adjustable shoe member seated over and secured to the axle; a slot formed in said latter member adapted to receive the lug on said fixed member; and the set screws entering said slot through the shoe member their inner ends adapted to engage against said lug; as, and for, the purpose set forth.

5. In combination with an axle and a spring bearing block, a block carried by the axle, a member having lugs engaging the spring bearing block, and means for effecting the adjustment of the member and the block of the axle, one with relation to the other.

In testimony whereof, I affix my signature, in presence of two witnesses.

CHARLES H. KRAMER.

Witnesses:
 BEATRICE FITZGERALD,
 J. P. APPLEMAN